(12) United States Patent
Nakayama et al.

(10) Patent No.: US 12,548,768 B2
(45) Date of Patent: Feb. 10, 2026

(54) ACTIVE MATERIAL LAYER FOR NEGATIVE ELECTRODE, METHOD FOR PRODUCING SAME, ELECTRODE MIXTURE PASTE FOR POWER STORAGE DEVICE NEGATIVE ELECTRODE, NEGATIVE ELECTRODE FOR POWER STORAGE DEVICE, AND POWER STORAGE DEVICE

(71) Applicant: UBE Corporation, Ube (JP)

(72) Inventors: Takeshige Nakayama, Ube (JP); Tetsuo Sakai, Yonezawa (JP); Masanori Morishita, Yonezawa (JP)

(73) Assignee: UBE CORPORATION, Ube (JP)

( * ) Notice: Subject to any disclaimer, the term of this patent is extended or adjusted under 35 U.S.C. 154(b) by 582 days.

(21) Appl. No.: 17/754,365

(22) PCT Filed: Oct. 1, 2020

(86) PCT No.: PCT/JP2020/037398
§ 371 (c)(1),
(2) Date: Mar. 30, 2022

(87) PCT Pub. No.: WO2021/066085
PCT Pub. Date: Apr. 8, 2021

(65) Prior Publication Data
US 2022/0376237 A1    Nov. 24, 2022

(30) Foreign Application Priority Data
Oct. 2, 2019   (JP) ................................. 2019-182337

(51) Int. Cl.
*H01M 4/38* (2006.01)
*H01M 4/02* (2006.01)
*H01M 4/04* (2006.01)
*H01M 4/62* (2006.01)
*H01M 10/0525* (2010.01)

(52) U.S. Cl.
CPC ......... *H01M 4/386* (2013.01); *H01M 4/0404* (2013.01); *H01M 4/0471* (2013.01); *H01M 4/622* (2013.01); *H01M 10/0525* (2013.01); *H01M 2004/021* (2013.01); *H01M 2004/027* (2013.01)

(58) Field of Classification Search
CPC .. H01M 4/386; H01M 4/0404; H01M 4/0471; H01M 4/622; H01M 10/0525; H01M 2004/021; H01M 2004/027
See application file for complete search history.

(56) References Cited

U.S. PATENT DOCUMENTS

2003/0148185 A1   8/2003   Kusumoto et al.
2003/0235762 A1   12/2003  Fukui et al.
2005/0244711 A1   11/2005  Fukui et al.
2008/0206631 A1   8/2008   Christensen et al.
2008/0206641 A1   8/2008   Christensen et al.
2009/0253033 A1   10/2009  Hirose et al.
2012/0276455 A1*  11/2012  Nishimura ............ H01M 4/621
                                                  429/232
2013/0171520 A1   7/2013   Nakayama et al.
2013/0323587 A1   12/2013  Kose et al.
2014/0218875 A1   8/2014   Nakayama et al.
2015/0280208 A1   10/2015  Kimura et al.
2016/0233513 A1   8/2016   Abe et al.
2017/0025671 A1*  1/2017   Nakayama ............ H01M 4/134

FOREIGN PATENT DOCUMENTS

| CN | 101557008 | 1/2012 |
|---|---|---|
| CN | 103930470 A | 7/2014 |
| JP | 2003-203637 A | 7/2003 |
| JP | 2004-022433 A | 1/2004 |
| JP | 2004-235057 A | 8/2004 |
| JP | 2004-288520 A | 10/2004 |
| JP | 2009-224239 A | 10/2009 |
| JP | 2009-252580 A | 10/2009 |
| JP | 2010-519706 A | 6/2010 |
| JP | 2013-069681 A | 4/2013 |
| JP | 2015-185509 A | 10/2015 |
| JP | 2017-092048 A | 5/2017 |
| JP | 2019-121557 A | 7/2019 |
| KR | 10-2013-0090885 | 8/2013 |
| KR | 10-2013-0135160 | 12/2013 |
| TW | I570157 | 2/2017 |
| WO | WO 2004/004031 A1 | 1/2004 |

OTHER PUBLICATIONS

Office Action in Taiwanese Patent Application No. 109134474, issued Mar. 24, 2021.
Office Action in Taiwanese Patent Application No. 109134474, issued Feb. 17, 2022.
Office Action in Taiwanese Patent Application No. 109134474, issued Jul. 22, 2022.
Decision of Refusal in Taiwanese Patent Application No. 109134474, issued Oct. 31, 2022.
Office Action received in Chinese patent Application No. 202080082150.5, dated Dec. 19, 2023.
Yasuo Takano et al., 2B23, p. 238(2007), The 48th Battery symposium in Japan, Partial English translation attached.
Written Opinion issued in International Application No. PCT/JP2020/037398, mailed Dec. 8, 2020.
International Preliminary Report of Patentability mailed Apr. 5, 2022 in International Application No. PCT/JP2020/037398.
Extended European Search Report in European Patent Application No. 20872424.5 issued on Sep. 16, 2024 in 51 pages.
Office Action in Korean Patent Application No. 10-2022-7014168 issued on Sep. 25, 2024 & English translation in 11 pages.

\* cited by examiner

*Primary Examiner* — Brian R Ohara
*Assistant Examiner* — Emily Elizabeth Freeman
(74) *Attorney, Agent, or Firm* — Knobbe, Martens, Olson & Bear, LLP

(57) ABSTRACT

This power storage device uses a negative electrode active material layer which contains a negative electrode active material containing silicon-based particles and a polyimide-based binder, wherein the negative electrode active material layer has a porosity of less than 20%. This power storage device has a high charge/discharge capacity and excellent cycle characteristics.

8 Claims, No Drawings

ACTIVE MATERIAL LAYER FOR NEGATIVE ELECTRODE, METHOD FOR PRODUCING SAME, ELECTRODE MIXTURE PASTE FOR POWER STORAGE DEVICE NEGATIVE ELECTRODE, NEGATIVE ELECTRODE FOR POWER STORAGE DEVICE, AND POWER STORAGE DEVICE

TECHNICAL FIELD

The present invention relates to an active material layer for a negative electrode and a method for manufacturing the same, an electrode mixture paste for a negative electrode of a power storage device, a negative electrode for a power storage device, and a power storage device.

BACKGROUND ART

A power storage device is a device that can store electrical energy when needed and extract energy when needed. A typical storage device includes a secondary battery such as a lithium ion secondary battery, which is widely used as a drive power source for mobile information terminals. In recent years, development of higher capacity storage devices has been promoted in anticipation of development in industrial applications such as electric/hybrid vehicles and unmanned aerial vehicles. One of the attempts is to increase the charge/discharge capacity by using, for example, silicon, tin or an alloy containing these having a large lithium storing amount per unit volume as the negative electrode active material of the power storage device.

However, an active material having a large charge/discharge capacity such as silicon, tin, or an alloy containing these causes a very large volume change with charge/discharge. When a general-purpose binder such as polyvinylidene fluoride or a rubber-based resin is used for the electrode containing these active materials, the active material layer is destroyed or the interface between the current collector and the active material layer is peeled off due to the volume change, leading to a problem that the cycle characteristics of the power storage device are deteriorated.

As a method for improving this problem, there has been proposed a method comprising binding silicon-based particles having an average particle diameter of 1 to 10 microns using polyimide which has excellent mechanical properties, and subjecting heat-pressure treatment to form a negative electrode active material layer (Patent Documents 1 to 5).

It has been pointed out that in the negative electrode using the polyimide as a binder disclosed in the above patent documents, cracks occur in the negative electrode active material layer by charging/discharging, and an island-like structure having a space capable of absorbing volume expansion during charging/discharging is formed, which leads to the improvement in the capacity retention ratio in repeated charging/discharging (see, Non-Patent Document 1). Recently, a negative electrode focusing on the shape of the active material layer has also been studied (see, Patent Document 6).

CITATION LIST

Patent Document

Patent Document 1: WO 2004/004031
Patent Document 2: Japanese Patent Laid-Open Publication No. 2004-235057
Patent Document 3: Japanese Patent Laid-Open Publication No. 2003-203637
Patent Document 4: Japanese Patent Laid-Open Publication No. 2004-288520.
Patent Document 5: Japanese Patent Laid-Open Publication No. 2004-022433
Patent Document 6: Japanese Patent Laid-Open Publication No. 2017-092048

Non-Patent Document

Non-Patent Document 1: Proceedings of the 48th Battery Symposium in Japan, 2B23, p. 238 (2007) (Yasuo Takano, et al.)

SUMMARY OF THE INVENTION

Technical Problem

However, in some cases, it is difficult to achieve both high capacity and excellent cycle characteristics in industrial applications such as electric/hybrid automobiles with the negative electrode using the previously disclosed polyimide as a binder.

Further, the present inventors carried out repeating-experiment of Patent Document 6, and found that the negative electrode of Patent Document 6 maintains the discharge capacity ratio of 0.9 up to merely 10 cycles in the cycle characteristics based on the second discharge/charge capacity. Negative electrodes having high capacity enough to withstand practical use in industrial applications and excellent cycle characteristics at the same time have not been achieved by only specifying the porosity.

Therefore, the present invention solves the above-mentioned problems, and the object thereof is to provide an electrode mixture paste for a negative electrode of a power storage device, a negative electrode active material layer, a negative electrode for a power storage device and a storage device, which are capable of achieving both high charge/discharge capacity and excellent cycle characteristics.

Solution to Problem

The present invention particularly relates to the following items.
1. A negative electrode active material layer comprising:
   silicon-based particles comprising silicon as a component and capable of absorbing and releasing lithium ions, and
   a polyimide-based binder which is an organic polymer having an imide bond in a main chain;
   wherein the negative electrode active material layer has a porosity of less than 20%.
2. The negative electrode active material layer according to the above item 1, wherein the silicon-based particles have an average particle diameter of less than 10 μm.
3. The negative electrode active material layer according to the above item 1 or 2, wherein the amount of the polyimide-based binder is 30% by mass or less with respect to the total mass of the negative electrode active material layer.
4. The negative electrode active material layer according to any one of the above items 1 to 3, wherein a precursor for forming the polyimide-based binder is a polyamic acid comprising a repeating unit represented by following chemical formula (I).

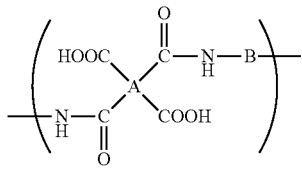

(I)

(wherein, A is one or more groups selected from the group consisting of a tetravalent group obtained by removing carboxyl groups from an aromatic tetracarboxylic acid, a tetravalent group obtained by removing carboxyl groups from an aliphatic tetracarboxylic acid, and a tetravalent group obtained by removing carboxyl groups from an alicyclic tetracarboxylic acid; B is one or more groups selected from the group consisting of a divalent group obtained by removing amino groups from an aromatic diamine, a divalent group obtained by removing amino groups from an aliphatic diamine, and a divalent group obtained by removing amino groups from an alicyclic diamine.)

5. An electrode mixture paste for a negative electrode of a power storage device, which is used for forming the negative electrode active material layer according to any one of the above items 1 to 4.
6. A method for producing a negative electrode active material layer, comprising casting or applying the electrode mixture paste for a negative electrode of a power storage device according to the above item 5 on a current collector, and heat-treating the paste.
7. A negative electrode for a power storage device, comprising the negative electrode active material layer according to any one of the above items 1 to 4.
8. A power storage device comprising the negative electrode for the power storage device according to the above item 7.

Advantageous Effect of Invention

According to the present invention, provided is a negative electrode active material layer and a method for manufacturing the same, an electrode mixture paste for a negative electrode of a power storage device, a negative electrode for a power storage device, and a power storage device which are capable of achieving both high charge/discharge capacity and excellent cycle characteristics.

DESCRIPTION OF EMBODIMENTS

<<Negative Electrode Active Material Layer>>

A negative electrode active material layer, which is one of the embodiments of the present invention, comprises silicon-based particles comprising silicon as a component and capable of absorbing and releasing lithium ions, and a polyimide-based binder which is an organic polymer having an imide bond in its main chain. In addition, the characteristic feature thereof is that the negative electrode active material layer has a porosity of less than 20%.

(Polyimide-Based Binder)

The polyimide-based binder contained in the negative electrode active material layer of the present invention is an organic polymer having an imide bond in the main chain. The polyimide-based binder is not particularly limited, and known polyimide-based binders used as an electrode binder may be used. Specific examples thereof include organic polymers having an imide bond in the main chain such as polyimide, polyamide-imide, and polyesterimide. Further, in the present invention, a substance for forming the "polyimide-based binder" in a negative electrode active material layer is referred to as "precursor", and a substance containing the "precursor" and a solvent, and if necessary, other compounds is referred to as "precursor composition". The precursor composition is sometimes referred to as "varnish".

A "precursor" is an organic polymer having an imide bond in the main chain, or a polymer or compound capable of forming an organic polymer having an imide bond in the main chain by heating or a chemical reaction. Examples of the "precursor" which is an organic polymer having an imide bond in the main chain include polyimide, polyamide-imide, polyesterimide and the like, and these are generally used in the form of a precursor composition (varnish) dissolved in a solvent. These may be the same as the organic polymer which is a "polyimide-based binder", and may have a small imidization ratio or a small molecular weight. Examples of the "precursor" which is a polymer or compound capable of forming an organic polymer having an imide bond in the main chain by heating or a chemical reaction include polyamic acids and the like. These are also generally used in the form of precursor compositions (varnishes) dissolved in solvents. In the polyamic acid, a part of the amic acid moieties may have been imidized. Further, the organic polymer which is a "polyimide-based binder" does not have to be completely imidized.

Such a polyimide-based binder or precursor may be used alone or in combination of two or more. In this technical field, "precursor" or "precursor composition" may also be referred to as "binder", and in the following description, the "precursor" may also be referred to as "polyimide-based binder". However, it is clear from the context in which the term is used whether it refers to a precursor or a polyimide-based binder in a negative active material layer.

For example, as a precursor capable of forming an organic polymer having an imide bond in the main chain by heating or a chemical reaction, a polyamic acid, particularly a polyamic acid containing a repeating unit represented by the following chemical formula (I) is preferable.

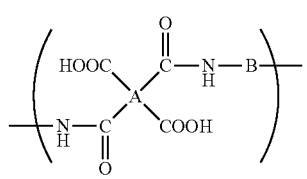

(I)

(wherein, A is one or more groups selected from the group consisting of a tetravalent group obtained by removing carboxyl groups from an aromatic tetracarboxylic acid, a tetravalent group obtained by removing carboxyl groups from an aliphatic tetracarboxylic acid, and a tetravalent group obtained by removing carboxyl groups from an alicyclic tetracarboxylic acid; B is one or more groups selected from the group consisting of a divalent group obtained by removing amino groups from an aromatic diamine, a divalent group obtained by removing amino groups from an aliphatic diamine, and a divalent group obtained by removing amino groups from an alicyclic diamine.)

For example, as the precursor which is an organic polymer having an imide bond in the main chain, a polyimide containing a repeating unit represented by the following chemical formula (II) is preferable.

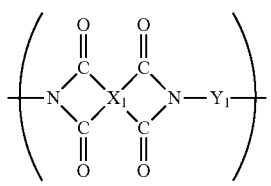

(II)

(wherein, $X_1$ is one or more groups selected from the group consisting of a tetravalent group obtained by removing carboxyl groups from an aromatic tetracarboxylic acid, a tetravalent group obtained by removing carboxyl groups from an aliphatic tetracarboxylic acid, and a tetravalent group obtained by removing carboxyl groups from an alicyclic tetracarboxylic acid; $Y_1$ is one or more groups selected from the group consisting of a divalent group obtained by removing amino groups from an aromatic diamine, a divalent group obtained by removing amino groups from an aliphatic diamine, and a divalent group obtained by removing amino groups from an alicyclic diamine.)

The precursor for forming such a polyimide-based binder can be prepared by a known method using a tetracarboxylic acid component having A moiety of the chemical formula (I) or $X_1$ moiety of the chemical formula (II) and a diamine component having B moiety of the chemical formula (I) or $Y_1$ moiety of the chemical formula (II) as essential components and other components as necessary.

The tetracarboxylic acid component is not particularly limited and can be appropriately selected in consideration of the intended porosity of the negative electrode active material layer and the desired characteristics of the power storage device. Preferred examples of the tetracarboxylic acid component include:

aromatic tetracarboxylic dianhydrides such as 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenone tetracarboxylic dianhydride, 4,4'-oxydiphthalic dianhydride, diphenylsulfonetetracarboxylic dianhydride, p-terphenyltetracarboxylic dianhydride, m-terphenyltetracarboxylic dianhydride;

alicyclic tetracarboxylic dianhydrides such as cyclobutane-1,2,3,4-tetracarboxylic dianhydride, 1,2,4,5-cyclohexanetetracarboxylic dianhydride, dicyclohexyl-3,3',4,4'-tetracarboxylic dianhydride, 1,2,4,5-cyclohexanetetracarboxylic acid-1,2:4,5-dianhydride, bicyclo[2.2.2]oct-7-en-2,3:5,6-tetracarboxylic dianhydride;

halogen-substituted tetracarboxylic dianhydrides such as 4,4'-(hexafluoroisopropyridene) diphthalic anhydride, 3,3'-(hexafluoroisopropyridene) diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)pyropyridene]diphthalic anhydride, 1H-difluoro[3,4-b:3',4'-i]xanthene-1,3,7,9 (11H)-tetron, 5,5'-oxybis[4,6,7-trifluoro-pyromellitic anhydride], 3,6-bis(trifluoromethyl)pyromellitic dianhydride, 4-(trifluoromethyl)pyromellitic dianhydride, 1,4-difluoropyromellitic dianhydride, 1,4-bis (3,4-dicarboxytrifluorophenoxy) tetrafluorobenzene dianhydride; and the like. These may be used alone or in combination of two or more.

The diamine component is not particularly limited and can be appropriately selected in consideration of the intended porosity of the negative electrode active material layer and the desired characteristics of the power storage device. Preferred examples of the diamine component include:

aromatic diamines such as p-phenylenediamine, m-phenylenediamine, 4,4'-diaminodiphenyl ether, 4,4'-diaminodiphenylmethane, 2,4-toluenediamine, 3,3'-dihydroxy-4,4'-diaminobiphenyl, bis (4-amino-3-carboxyphenyl) methane, 2,4-diaminotoluene;

halogen-substituted diamines such as 2,2'-bis (trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene (dimethaneamine), 2,2'-difluoro (1,1'-biphenyl)-4,4'-diamine, 4,4'-diaminooctafluorobiphenyl, 2,2-bis (4-aminophenyl) hexafluoropropane, 4,4'-oxybis (2,3,5,6-tetrafluoro aniline);

aliphatic or alicyclic diamines such as trans-1,4-diaminocyclohexane, cis-1,4-diaminocyclohexane, 1,6-hexamethylenediamine, 1,10-decamethylenediamine, 1,3-bis (aminomethyl) cyclohexane, 1,4-bis (aminomethyl) cyclohexane; and the like. these may be used alone or in combination of two or more.

In the chemical formula (I) or the chemical formula (II), from the viewpoint of mechanical strength, battery characteristics, and the like, $X_1$ preferably comprises a tetravalent group that is obtained by removing carboxyl groups from an aromatic tetracarboxylic acid giving a bent structure such as an ether bond and the like. Among them, it is particularly preferable that all of $X_1$ and $Y_1$ comprise aromatic groups. In another aspect, from the viewpoint of flexibility, formability of the negative electrode active material layer, battery characteristics, and the like, $Y_1$ preferably comprises an aliphatic group in the chemical formula (I) or (II). Among them, it is particularly preferable that $X_1$ comprises an aromatic group and $Y_1$ comprises an aliphatic group in an amount about 30 to 80 mol %.

Examples of commercially available and usable precursor products include UPIA (registered trademark)-AT, UPIA (registered trademark)-ST, UPIA (registered trademark)-NF, UPIA (registered trademark)-LB, all of which are available from Ube Industries, Ltd. and the like.

The molar ratio [tetracarboxylic acid component/diamine component] of the tetracarboxylic acid component and the diamine component constituting the polyamic acid and/or the polyimide used in the present invention may be set to approximately equimolar, specifically 0.95 to 1.05, and preferably 0.97 to 1.03. The molar ratio within this range may provide a polyimide having high molecular weight, and secure toughness when used as a binder. Further, the polyamic acid and/or polyimide used in the present invention has a logarithmic viscosity of 0.2 or more, preferably 0.4 or more, more preferably 0.6 or more, further more preferably 0.7 or more measured at a temperature of 30° C. and a concentration of 0.5 g/100 mL. The logarithmic viscosity in the above range may provide a polyamic acid and/or polyimide having high molecular weight and having mechanical properties suitable as a binder. The weight average molecular weight determined by gel permeation chromatography (GPC) is preferably 1,000 to 1,000,000, particularly preferably 5,000 to 500,000. Specifically, the weight average molecular weight is, for example, 1,000 or more, preferably 5,000 or more, more preferably 7,500 or more, still more preferably 9,000 or more, and for example, 1,000,000 or less, preferably 500,000 or less, more preferably 300,000 or less, still more preferably 100,000 or less, still more preferably 50,000 or less, still more preferably 30,000 or less. These logarithmic viscosities and molecular weights can be arbitrarily set by adjusting the molar ratio of the tetracarboxylic acid component and the diamine component to be used, and they may be appropriately determined in consideration of the mechanical strength of the negative electrode active material layer, the characteristics of the desired power storage device, the application, and the like. In the present invention, the polyamic acid and/or polyimide has a sufficiently high molecular weight that can exert its function even in a small amount. Examples of commercial products (polyimide precursor composition; varnish) containing a polyamic acid and/or polyimide having the above molecular weight include UPIA (registered trademark)-LB-1001 and UPIA (registered trademark)-LB-2001 available from Ube Industries, Ltd. and the like.

When the precursor is a polyamic acid, the polyamic acid can be easily prepared by reacting a tetracarboxylic acid component and a diamine component in a solvent according to a known method. When the polyimide-based binder used in the present invention is a polyimide, the polyimide is preferably prepared by a method including adding a tetracarboxylic acid component at one time or in multiple steps to a solution in which a diamine component is dissolved in a solvent, and heating or adding a catalyst or a chemical imidization agent to perform polymerization (imidization reaction).

When the negative electrode mixture paste for the negative electrode of the power storage device of the present invention is used to form the negative electrode active material layer on the current collector, the mixing amount of the polyimide binder may be such a range that it does not hinder the formation of the negative electrode active material layer having a predetermined porosity range. For example, the polyimide-based binder (solid content of the precursor) is 0.5% by mass to 50% by mass, and preferably 1% by mass or more and 45% by mass or less based on the total solid content of the electrode mixture paste for the negative electrode of the power storage device. The upper limit may be more preferably 30% by mass or less, further preferably less than 20% by mass, still more preferably less than 10% by mass, still more preferably less than 5% by mass. In the present invention, it is possible to sufficiently exert the binder function with a small amount of binder (solid content), and as a result, the effects of the present application such as high discharge capacity and excellent cycle characteristics can be obtained. It is presumed that the use of a polyamic acid and/or polyimide having a high molecular weight is one of the reasons for the excellent effect in the present application. Herein, the solid content of the precursor means the mass when completely imidized.

(Negative Electrode Active Material)

The negative electrode active material layer of the present invention comprises a negative electrode active material comprising silicon-based particles. The silicon-based particles in the present invention are particles that contain silicon as a component and can absorb and release lithium ions. Examples of the silicon-based particles include silicon, silicon metal composites (including an alloy of silicon and another metal), silicon oxide, silicon-silicon dioxide composite, and the like, and these may be used alone or used in combination of two or more.

The shape of the negative electrode active material is not particularly limited, and may be any shape such as an indefinite shape, a spherical shape, and a fibrous shape. The average particle diameter of the negative electrode active material is preferably less than 10 μm, and from the viewpoint of ensuring better cycle characteristics, it is particularly preferably 5 μm or less. The average particle diameter is, for example, 0.01 μm or more. The negative electrode active material having such an average particle diameter may consist of one type or may have an average particle diameter prepared by mixing two or more types.

Herein, the average particle diameter is a value relating to the primary particles of the silicon-based particles which are the negative electrode active material, and refers to the average particle diameter of the silicon-based particle powder, and may be measured by, for example, a laser diffraction type particle diameter distribution measuring device. The average particle diameter may be determined from a scanning electron microscope (SEM) image on the surface of the negative electrode after the negative electrode is manufactured using the silicon-based negative electrode active material. When the particles are not spherical, particle diameter refers to the longest part (major diameter) of the particles.

As described above, the negative electrode active material can be used by appropriately combining the components, shapes and/or average particle diameters of the silicon-based particles according to the intended charge/discharge capacity and other characteristics of the power storage device.

Further, the negative electrode active material of the present invention may contain other active materials other than silicon-based particles, if necessary. As other active materials, known active materials other than silicon-based particles can be used, and examples thereof include graphite particles such as natural graphite and artificial graphite, and particles of metals such as tin, germanium, antimony silver, copper and nickel, and alloys of these. The average particle diameter of these other active materials is not particularly limited, but is preferably 5 μm or less.

The mixing ratio of the silicon-based particles and the other active material is not particularly limited, and can be appropriately added in consideration of the charge/discharge capacity and the other characteristics of the power storage device. In one embodiment, the amount the other active material (particularly graphite particles) is preferably 15% by mass or less, more preferably 10% by mass or less, still more preferably 5% by mass or less, based on the total amount of the negative electrode active material. It is also preferable that it does not contain an active material other than silicon-based particles.

The amount of the negative electrode active material in the negative electrode active material layer is not particularly limited as long as it functions as the negative electrode active material layer. Usually, it is 0.1 to 1000 times, preferably 1 to 1000 times, more preferably 5 to 1000 times, still more preferably 10 to 1000 times based on the mass of the above-mentioned polyimide-based binder. The upper limit is preferably 500 times or less, more preferably 100 times or less, still more preferably 50 times or less. If the amount of the negative electrode active material is too large, the negative electrode active material is not sufficiently bound to the current collector and tends to fall off. On the other hand, if the amount of the negative electrode active material is too small, the negative electrode active material layer formed on the current collector has many inert portions, and the function as a negative electrode for a power storage device may be insufficient.

(Porosity)

The present invention is characterized in that the porosity of the negative electrode active material layer is less than 20%. It is preferably 18% or less, more preferably 15% or less. The porosity is at least 3% or more, preferably 5% or more. By setting the porosity as described above, it is possible to increase the conduction speed of lithium, leading to improvement in cycle characteristics, output characteristics, and the like.

Here, the porosity in the present invention means a value calculated from the apparent density of the negative electrode active material layer and the true density (specific gravity) and the blending amount of the individual components constituting the negative electrode active material layer (for example, the negative electrode active material (silicon-based particles), the polyimide-based binder, and optional materials (other active materials, polymer binder, and the like)). Specifically, it can be calculated by the following equation 1.

$$\text{Porosity (\%)}=100-N(W_{A1}/D_{A1}+W_{A2}/D_{A2}+\ldots W_{An}/D_{An}+W_{B1}/D_{B1}+W_{B2}/D_{B2}+\ldots+W_{Bm}/D_{Bm}) \quad \text{(Equation 1)}$$

For example, porosity is calculated from the following equation for a negative electrode active material layer which has apparent density of N (g/cm$^3$) and is a blend of $W_{A1}$ mass % of a negative electrode active material (true density $D_{A1}$ (g/cm$^3$)), $W_{A2}$ mass % of another active material (true density $D_{A2}$ (g/cm$^3$)), and $W_{B1}$ mass % of a polyimide-based binder (true density $D_{B1}$ (g/cm$^3$)) and $W_{B2}$ mass % of another polymer-based binder (true density $D_{B2}$ (g/cm$^3$)).

$$\text{Porosity (\%)}=100-N(W_{A1}/D_{A1}+W_{A2}/D_{A2}+W_{B1}/D_{B1}+W_{B2}/D_{B2}) \quad \text{(Equation 2)}$$

When two or more of polyimide-based binders are used, it is necessary to consider the true density and mass of each component. As to other active materials and other polymers, each component must be considered individually. As shown in the present Examples, both high capacity and excellent cycle characteristics are realized at the same time by satisfying the porosity specified in the present invention.

(Polymer-Based Binder)

In the present invention, a polymer-based binder other than the above-mentioned polyimide-based binder may be contained. The polymer-based binder is not particularly limited as long as it does not inhibit the functions of the polyimide-based binder and the negative electrode active material, and examples thereof include anion-type polymers such as poly(meth)acrylic acid, polysulfonic acid, and salts thereof; water-soluble cellulose derivatives such as carboxyalkyl celluloses and hydroxyalkyl celluloses; water-soluble polymers such as polyvinyl alcohols, polyalkylene glycols, polyvinylpyrrolidone, and salts thereof and arginate salts; acrylic resins, synthetic rubbers, polyamides and silicone-based resins (including silicone oils) and the like. In addition, not limited to these, any known electrode binder can also be used.

As a polymer-based binder other than the polyimide-based binder, one or two or more types may be appropriately selected and used according to the function to be imparted to the negative electrode active material layer, the power storage device, and the like. Further, depending on a solvent to be used, a water-soluble polymer can be selected if it is an aqueous solvent system, and a polymer soluble in an organic solvent can be selected if it is an organic solvent system. The amount (solid content of the precursor) of the polymer-based binder other than the polyimide-based binder can be appropriately set according to the purpose. For example, the amount of the other polymer-based binder is 0 to 1000 parts by mass (10 times the amount) with respect to 100 parts by mass of the polyimide-based binder (solid content of the precursor). In one embodiment, the amount of the other polymer-based binder is 50 parts by mass or less, preferably 20 parts by mass or less, and it is also preferable that the polymer-based binder other than the polyimide-based binder is not contained at all (0 parts by mass). Further, in another embodiment, the amount of the other polymer-based binder is preferably 20 parts by mass or more, more preferably 40 parts by mass or more, and for example, 300 parts by mass or less, with respect to 100 parts by mass of the polyimide-based binder (solid content of the precursor).

(Conductive Assisting Agent)

The negative electrode active material layer of the present invention may contain a conductive assisting agent, if necessary. As such a conductive assisting agent, a conventionally known conductive assisting agent can be used, and one or two or more types can be used depending on the characteristics of the intended negative electrode active material layer and the power storage device. The conductive assisting agent is not particularly limited as long as it is a conventionally known conductive assisting agent, and examples thereof include carbon-based conductive assisting agents such as graphite, acetylene black, and carbon black; and metal-based conductive assisting agents such as silver, copper, nickel, alloys of these, and the like As described above, in one embodiment of the present embodiment, it is preferable that the amount of active material other than silicon-based particles is small or not contained, and in that case, materials such as acetylene black, carbon black and the like which does not absorb lithium in particles are more preferably used than a material having charge/discharge capacity such as graphites.

(Optional Component)

The negative electrode active material layer of the present invention may contain other additives, if necessary. The other additives can be used as long as the effect of the present invention is not impaired, and specifically, examples thereof include catalysts (for example, amine compounds or imidazole compounds); chemical imidizing agent (for example, acid anhydrides such as acetic anhydride, or amine compounds such as pyridine and isoquinolin); antioxidants (for example, phenol-based or phosphorus-based antioxidants); photostabilizers (for example, hindered amine-based stabilizers); antistatic agents (for example, surfactants, carbons, metal oxides); plasticizers (for example, ester-based plasticizers, epoxidized vegetable oils); oil-soluble solvents (for example, 1-acetonafton, acetophenone, benzylacetone, methylacetophenone, dimethylacetophenone, propiophenone, valerophenone, anisole, methyl benzoate, benzyl benzoate); rust preventives (for example, zinc compounds, lead compounds, diphenylamines, etc., adipic acid, ethanolamine and monoethanolamine, ethylene glycol monoethyl ether, trimethylamine, nonylphenol, hexamethylenediamine, pentaerythritol, etc., dicyclohexylammonium nitrite, diisopropylammonium nitrite and mixtures thereof, caplate, laurate, carbonate, etc. of dicyclohexylammonium, benzotriazole and alkylbenzotriazole, etc., amine salts, lower fatty acids and salts thereof, etc.); silane coupling agent; titanium coupling agent; flame-retardant material (for example, bromine-based flame-retardant, phosphorus-based flame retardant, antimony oxide, aluminum hydroxide, etc.); defoaming agents (for example, silicone-based defoaming agent, acrylic-based defoaming agent, fluorine-based defoaming agent); leveling agents (for example, silicone-based leveling agents, acrylic-based leveling agents); smoothing agents (for example, benzyl alcohol, 2-phenylethyl alcohol, 4-methylbenzyl alcohol, 4-methoxybenzyl alcohol, 4-chlorobenzyl alcohol, 4-nitrobenzyl alcohol, phenoxy-2-ethanol, cinnamyl alcohol, furfuryl alcohol and naphthylcarbinol polyethylene glycol, coumarin, 2-butin-1,4-diol, 2-Propin-1-ol, 3-phenylpropionic acid, etc.); leology control agents (additive for flow control purpose); viscosity adjusting agents; release agent; surfactant (for example, anionic surfactant, cationic surfactant, amphiphilic surfactant, nonionic surfactant); metal soap (for example, salt of fatty acid such as stearic acid, lauric acid, lysinolic acid, octyl acid and metal such as lithium, magnesium, calcium, barium, zinc); supporting electrolyte (for example, halides or nitrates of alkali metal, perchlorates of tetraalkylammonium and salts of strong acids such tetrafluoroboric acid); and the like.

The thickness of the negative electrode active material layer of the present invention can be appropriately set according to the characteristics or shape of the intended negative electrode or power storage device. For example, it can be about 0.5 μm to 300 μm, preferably 1 μm or more. The thickness of the negative electrode active material layer is preferably 50 μm or less, more preferably 30 μm or less.

<<Electrode Mixture Paste for Negative Electrode of Power Storage Device>>

The electrode mixture paste for the negative electrode of the power storage device, which is one of the embodiments of the present invention, is used for forming the above-mentioned negative electrode active material layer.

The electrode mixture paste for the negative electrode of the power storage device comprises a negative electrode active material, a polyimide-based binder, and other optional components. As for each of these components, the same components as those disclosed in the above section of the negative electrode active material layer may be used. Further, the electrode mixture paste for the negative electrode of the power storage device of the present invention can contain various additives as needed.

(Solvent)

The electrode mixture paste for the negative electrode of the power storage device of the present invention may contain a solvent, if necessary. Such a solvent can be appropriately selected depending on the intended power storage device, electrode mixture paste and the like. For example, an organic solvent, an aqueous solvent (water or a solvent containing water), or a mixture thereof can be used. Above all, a solvent used for preparing a polyimide-based binder (polyamic acid, polyimide resin, and the like) can be preferably used.

The organic solvent is not particularly limited, and examples thereof include amide solvents such as N, N-dimethylformamide, N, N-dimethylacetamide, N, N-diethylacetamide, N-methyl-2-pyrrolidone, N-ethyl-2-pyrrolidone, N-vinyl-2-pyrrolidone; cyclic ester solvents such as γ-butyrolactone, γ-valerolactone, δ-valerolactone, γ-caprolactone, ε-caprolactone, α-methyl-γ-butyrolactone; carbonate solvents such as ethylene carbonate, propylene carbonate; glycol-based solvents such as triethylene glycol; phenol-based solvent such as phenol, o-cresol, m-cresol, p-cresol, 3-chlorophenol, 4-chlorophenol; acetophenone, 1,3-dimethyl-2-imidazolidinone, sulforane, dimethyl sulfoxide and the like. Further, examples that can also be used include: alcohol solvents such as methanol and ethanol; ester solvents such as butyl acetate, ethyl acetate, isobutyl acetate, ethyl propionate, ethyl butyrate, butyl butyrate, butyl benzoate, ethyl benzoate, and methyl benzoate; propropylene glycol methyl acetate, ethyl cellosolve, butyl cellosolve, 2-methyl cellosolve acetate, ethyl cellosolve acetate, butyl cellosolve acetate, tetrahydrofuran, dimethoxyethane, diethoxyethane, dibutyl ether, diethylene glycol dimethyl ether, methylisobutylketone, diisobutylketone, cyclopentanone, cyclohexanone, methyl ethyl ketone, acetone, butanol, ethanol, xylene, toluene, chlorbenzene, n-methylcaprolactam, hexamethylphosphorotriamide, bis(2-methoxyethyl) ether, 1,2-bis(2-methoxyethoxy)ethane, bis[2-(2-methoxyethoxy)ethyl] ether, 1,4-dioxane, dimethylsulfoxide, dimethylsulfone, diphenyl ether, diphenylsulfone, tetramethylurea, anisole, turpentine, mineral spirit, petroleum naphtha solvents, biodegradable methyl lactate, ethyl lactate, butyl lactate and other common organic solvents. The organic solvent may be used alone or in combination of two or more kinds.

As a method for preparing the electrode mixture paste for the negative electrode of the power storage device of the present invention, a general preparation method can be adopted, and examples thereof include a method of mixing a negative electrode active material with a polyimide-based binder at an appropriate temperature range (preferably 10° C. to 60° C.).

<<Manufacturing Method of Negative Electrode Active Material Layer>>

The method for producing the negative electrode active material layer, which is one of the embodiments of the present invention, is not particularly limited as long as the intended negative electrode active material layer can be produced. An example includes a method of forming a negative electrode active material layer by casting or applying an electrode mixture paste for a negative electrode of a power storage device on a current collector and heat-treating the paste. The polyamic acid can be easily converted into polyimide by heat treatment or chemical treatment such as an imidizing agent. Hereinafter, a method for producing the negative electrode active material layer will be described in detail with reference to this example.

As a current collector used in the present invention, an electron conductor that does not cause a general chemical change can be used. Examples of the material forming these current collectors include aluminum, copper, copper alloy, iron, stainless steel, nickel, titanium, and the like. In addition, those in which the surface of aluminum, copper, copper alloy, iron, and stainless steel is treated with carbon, nickel, titanium, silver or the like (those having a thin film formed) can be used. Among them, aluminum, copper, copper alloy, nickel-plated steel, stainless steel and the like can be preferably used.

As the shape of the current collector, a foil-like (sheet-like) shape is usually used, but a net, a punched body, a porous body, a molded body of a fiber aggregate, and the like may be appropriately used depending on the intended power storage device. Further, the current collector may be surface-treated to form a rough surface.

The thickness of the current collector is not particularly limited, and can usually be 1 μm to 500 μm. In the present invention, a metal foil such as a copper foil, a stainless steel foil, or a nickel foil can be preferably used as the current collector, and among them, a copper foil such as an electrolytic copper foil or a rolled copper foil can be preferably used. The thickness of these metal foils is not particularly limited, and can be usually 5 to 50 μm, preferably 9 to 18 μm.

When a metal foil is used as the current collector, the surface of the foil may be roughened or rust-proofed from the viewpoint of improving the adhesiveness. Further, a conductive adhesive layer may be laminated on the foil surface. The conductive adhesive layer can be formed by blending conductive particles such as graphite with an organic polymer compound.

As a method of applying the electrode mixture paste for the negative electrode of the power storage device on the current collector, a method of continuously applying by roll-to-roll or a method of applying by sheet-fed processing can be adopted. Further, as the coating device, for example, a die coater, a multi-layer die coater, a gravure coater, a comma coater, a reverse roll coater, a doctor blade coater and the like can be used.

The heat treatment is preferably carried out under such conditions that (i) remove the solvent contained in the electrode mixture paste for a negative electrode of a power storage device, and (ii) allow the polyimide-based binder to melt or imidize so as to integrate with other components constituting the negative electrode active material layer (for example, the negative electrode active material) and, at the same time, to adhere the current collector and the negative electrode active material layer each other. For example, it is preferable to perform the heat treatment at a temperature equal to or higher than the melting point of the polyimide-based binder to be used, and if necessary, under pressure. The heat treatment may be performed only once or may be performed a plurality of times.

The heat treatment temperature is not particularly limited as long as the negative electrode active material layer can be manufactured, and it can be set as appropriate according to the type of the polyimide-based binder (precursor), the type of the solvent, and the like contained in the electrode mixture paste for the negative electrode of the power storage device to be used. The heat treatment temperature is, for example, preferably 80° C. to 350° C., more preferably 100° C. to 300° C., and particularly preferably 120° C. to 250° C. The heat treatment temperature lower than 80° C. may not be preferable because it may take a long time to remove the solvent, the melting is insufficient and the imidization reaction is slowed down. A temperature higher than 350° C. may not be preferable because deterioration of the current collector, the polyimide-based binder and/or the polymer-based binder may occur. In the heat treatment, the temperature may be raised stepwise in multiple stages in order to prevent foaming and powdering.

The heat treatment time is not particularly limited as long as it can produce a desired negative electrode active material layer, but can be set in the range of, for example, 3 minutes to 48 hours. Within the above range, the imidization reaction and the removal of the solvent can be sufficiently performed, and it is preferable from the viewpoint of productivity. During this time, most of the solvent is removed, and the polyamic acid becomes substantially polyimide by the imidization reaction.

In the present invention, a pressurizing step may be added. For example, the pressurizing may be carried out before the heat treatment, after the heat treatment, or at the same time as the heat treatment. When the heat treatment is performed a plurality of times, the pressurizing may be carried out during the heat treatment. The specific pressurizing conditions and pressurizing means are not particularly limited, and examples thereof include a method of pressing by using a roll press machine with a line pressure of 100 to 2000 kg/cm. Here, the porosity of the negative electrode active material layer should be appropriately adjusted according to the types of constituent components such as the polyimide-based binder and the negative electrode active material. Also the required pressurizing conditions and the like should also be appropriately controlled so that the porosity becomes a desired value in consideration of the type and the like of each constituent component.

Although it cannot be unequivocally concluded, the porosity, which is one of the constituent requirements of the present invention, tends to decrease as the applied pressure is increased, and therefore, the manufacturing conditions may be adjusted using this tendency as one of guidance. Further, it can be finely adjusted according to detailed conditions such as heat shrinkage and crosslink density.

When the negative electrode active material layer of the present invention is evaluated under the conditions disclosed in Examples described later, the capacity retention rate calculated by (discharge capacity after cycle test)÷(initial discharge capacity) is preferably more than 50%, more preferably 75% or more. Further, when evaluated under the same conditions, the initial charge/discharge efficiency calculated by (initial discharge capacity)÷(initial charge capacity) is preferably more than 81%, more preferably 89% or more.

<<Negative Electrode for Power Storage Device>>

The negative electrode for a power storage device, which is one of the embodiments of the present invention, has the above-mentioned negative electrode active material layer. More specifically, it has the negative electrode active material layer of the present invention on the current collector. As a method for manufacturing a negative electrode for a power storage device, a method of forming a negative electrode active material layer on a current collector may be adopted as described above. Further, in the negative electrode for a power storage device, one or two or more types of various functional layers may be laminated on the negative electrode active material layer depending on the embodiment of the power storage device.

<<Power Storage Device>>

The power storage device according to one of the embodiments of the present invention includes the negative electrode for a power storage device having the above-mentioned negative electrode active material layer. The negative electrode for a power storage device of the present invention described above can be suitably used to form a power storage device according to a known method. For example, a storage device can be suitably obtained by winding the obtained negative electrode and positive electrode for a power storage device into a cylindrical shape while sandwiching a separator such as a porous polyolefin body to form an electrode body in a cylindrical shape or in a compressed shape after further compressing it, and inserting the electrode body into an outer housing with a non-aqueous electrolytic solution.

The positive electrode in the present invention has a layer containing at least a positive electrode active material formed on a current collector. As the positive electrode active material, a general positive electrode active material can be used. Examples thereof include lithium-containing composite metal oxides, olivine-type lithium salts, chalcogen compounds, and manganese dioxide. The lithium-containing composite metal oxide is a metal oxide containing lithium and a transition metal, or a metal oxide in which a part of the transition metal in the metal oxide is replaced with a dissimilar element. Here, examples of the different elements include Na, Mg, Sc, Y, Mn, Fe, Co, Ni, Cu, Zn, Al, Cr, Pb, Sb, and B, and preference is given to Mn, Al, Co, Ni, Mg and the like are. The dissimilar elements may be one kind or two or more kinds. Among these, lithium-containing composite metal oxides are preferable. Examples of the lithium-containing composite metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (in each of the above formulas, M represents at least one element selected from the group consisting of Na, Mg, Sc, Y, Mn, Fe, Co, Ni, Cu, Zn, Al, Cr, Pb, Sb, V and B. X=0 to 1.2, y=0 to 0.9, z=2.0 to 2.3). Here, the x value indicating the molar ratio of lithium increases or decreases depending on charging and discharging. Moreover, as an olivine type lithium salt, for example, LiFePO$_4$ is exemplified. Examples of the chalcogen compound include titanium disulfide and molybdenum disulfide. The positive electrode active material may be used alone or in combination of two or more.

As a current collector used for the positive electrode, a commonly used current collector can be used.

The non-aqueous electrolytic solution is not particularly limited as long as it is usually used for a power storage device, and a non-aqueous solvent in which a lithium salt is dissolved is preferably used. Examples of the non-aqueous solvent include: cyclic carbonates such as ethylene carbonate, propylene carbonate, butylene carbonate; open-chain carbonates such as dimethyl carbonate, diethyl carbonate, ethylmethyl carbonate, dipropyl carbonate; aliphatic carboxylate esters such as methyl formate, methyl acetate, methyl propionate, ethyl propionate; lactones such as γ-butyrolactone and γ-valerolactone; open-chain ethers such as 1,2-dimethoxyethane, 1,2-diethoxyethane, and ethoxymethoxyethane; cyclic ethers such as tetrahydrofuran and 2-methyltetrahydrofuran, and the like. These can be used alone or in combination of two or more.

Examples of the lithium salt dissolved in a non-aqueous solvent include LiClO$_4$, LiBF$_4$, LiPF$_6$, LiAlCl$_4$, LiSbF$_6$, LiSCN, LiCl, LiCF$_3$SO$_3$, LiCF$_3$CO$_2$, Li(CF$_3$SO$_2$)$_2$, LiAsF$_6$, LiN(CF$_3$SO$_2$)$_2$, LiB$_{10}$Cl$_{10}$, lithium lower-aliphatic carboxylate, LiCl, LiBr, LiI, chloroborane lithium, lithium tetraphenylborate, lithium imide salt and the like. These can be used alone or in combination of two or more. The amount of the lithium salt dissolved in the non-aqueous solvent is not particularly limited, but is preferably 0.2 to 2 mol/L, and more preferably 0.5 to 1.5 mol/L.

Further, various additives may be further added to the non-aqueous electrolytic solution for the purpose of improving the charge/discharge characteristics of the power storage device. Examples of such additives include vinylene carbonate, vinylethylene carbonate, phosphazene and fluorobenzene, triethylphosphite, triethanolamine, cyclic ethers, ethylenediamine, n-glime, pyridine, hexaphosphate triamide, nitrobenzene derivatives, crown ethers, tertiary ammonium salts, ethylene glycol dialkyl ethers and the like. These additives are preferably blended in an amount of about 0.5 to 10% by mass of the non-aqueous electrolytic solution.

Further, in the present invention, an insulating microporous thin film conventionally used in lithium ion batteries can be used as a separator. The microporous thin film preferably has a function of closing the pores at a certain temperature or higher and increasing the resistance. As a material of the microporous thin film, polyolefins such as polypropylene and polyethylene having excellent organic solvent resistance and hydrophobicity are preferably used. Further, sheets, non-woven fabrics, woven fabrics and the like made of glass fibers and the like are also used.

The shape of the power storage device of the present invention is not particularly limited, and for example, a coin type, a button type, a sheet type, a cylindrical type, a compressed shape type, a rectangular type, or the like can be employed. When the shape of the power storage device is a coin type or a button type, the negative electrode mixture is mainly compressed into a pellet shape and used. The thickness and diameter of the pellet may be determined by the size of the power storage device. The wound body of the electrode in the present invention does not necessarily have to have a true cylindrical shape, and may have a long cylindrical shape having an elliptical cross section or a rectangular columnar shape having a rectangle cross section and the like.

Since the power storage device of the present invention has a negative electrode having a high charge/discharge capacity and capable of realizing excellent cycle characteristics, even in the so-called all-solid-state battery mode in which an electrolytic solution is not used, its capability is sufficiently exhibited and it can be used suitably.

EXAMPLES

Hereinafter, the present invention will be described in more detail with reference to Examples and Comparative Examples, but the present invention is not limited to these Examples.

The abbreviations of the compounds used in the following examples will be described. Polyimide-based binder (precursor composition): UPIA (registered trademark) LB-1001 (polyamic acid varnish manufactured by Ube Industries, Ltd. (solvent: NMP))
NMP: N-methyl-2-pyrrolidone
EC: Ethylene carbonate
DEC: diethyl carbonate
(1) Fabrication of Negative Electrode for Evaluation Silicon (average particle diameter 5 μm) as a negative electrode active material, UPIA (registered trademark)-LB-1001, and acetylene black as a conductive assisting agent were blended in a ratio of 80:2:18 (mass ratio; as for UPIA (registered trademark)-LB-1001 amount of solid content (polyimide precursor)), and NMP was added so that the slurry concentration became about 60% by mass to prepare a negative electrode mixture paste for a power storage device. This negative electrode mixture paste for a power storage device was applied onto a nickel-plated steel foil (thickness 10 μm) which was a current collector, and pre-dried at 80° C. for 10 minutes. Then, it was roll-pressed, placed in a vacuum dryer and heat-treated at 350° C. for 1 hour to prepare a negative electrode for evaluation (capacity density: 3 mAh/cm$^2$). By changing the line pressure of pressing, negative electrodes for evaluation having negative electrode active material layers having different porosities were prepared.
(2) Fabrication of Evaluation Batteries Using the negative electrode for evaluation obtained in (1) above, an evaluation battery was produced with the following configuration.
  Counter electrode: Lithium foil (metal lithium)
  Electrolyte solution: 1M LiPF$_6$/EC:DEC=1:1 (% by volume)
(3) Battery Evaluation The cycle characteristics were evaluated by repeatedly charging and discharging under the following conditions.
  Measurement temperature: 30° C.
  Charge/discharge range: SOC (battery charge rate) 30-90%
  Charge/discharge current value: 0.1 C The initial charge/discharge efficiency was calculated by (initial discharge capacity)÷(initial charge capacity).

The capacity retention rate was calculated by (discharge capacity after cycle test)÷(initial discharge capacity).

Herein, the absorption of Li in the "negative electrode for evaluation" is referred to as "charging", and the release of Li from the "negative electrode for evaluation" is referred to as "discharge".

Example 1

The charge/discharge cycle characteristics of the prepared evaluation battery (porosity of the negative electrode active material layer: 5%) were measured, and it was found that the capacity retention rate after 40 cycles was 95%. The initial charge/discharge efficiency was 90%.

Example 2

The charge/discharge cycle characteristics of the prepared evaluation battery (porosity of the negative electrode active material layer: 10%) were measured, and it was found that the capacity retention rate after 40 cycles was 88%. The initial charge/discharge efficiency was 89%.

Example 3

The charge/discharge cycle characteristics of the prepared evaluation battery (porosity of the negative electrode active material layer: 18%) were measured, and it was found that the capacity retention rate after 40 cycles was 75%. The initial charge/discharge efficiency was 94%.

Comparative Example 1

The charge/discharge cycle characteristics of the prepared evaluation battery (porosity of the negative electrode active material layer: 25%) were measured, and it was found that the capacity retention rate after 40 cycles was 50%. The initial charge/discharge efficiency was 81%.

Comparative Example 2

The charge/discharge cycle characteristics of the prepared evaluation battery (porosity of the negative electrode active material layer: 30%) were measured, and it was found that the capacity retention rate after 40 cycles was 44%. The initial charge/discharge efficiency was 67%.

Comparative Example 3

The charge/discharge cycle characteristics of the prepared evaluation battery (porosity of the negative electrode active material layer: 35%) were measured, and it was found that the capacity retention rate after 40 cycles was 48%. The initial charge/discharge efficiency was 44%.

The invention claimed is:

1. A method for producing a negative electrode active material layer, comprising casting or applying an electrode mixture paste for a negative electrode of a power storage device on a current collector, and heat-treating the electrode mixture paste at 80° C. to 350° C., thereby forming a negative electrode active material layer having a porosity of less than 20%, and
wherein the electrode mixture paste for a negative electrode of a power storage device comprises:
silicon-based particles comprising silicon as a component and capable of absorbing and releasing lithium ions, and
a precursor for forming a polyimide-based binder, wherein the precursor for forming the polyimide-based binder is a polyamic acid comprising a repeating unit represented by following chemical formula (I):

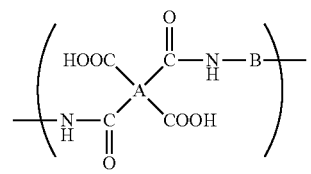

wherein, A is one or more tetravalent groups obtained by removing carboxyl groups from an aromatic tetracarboxylic acid; and B is one or more divalent groups obtained by removing amino groups from an aromatic diamine.

2. The method for producing a negative electrode active material layer according to claim 1, wherein the silicon-based particles have an average particle diameter of less than 10 µm.

3. The method for producing a negative electrode active material layer according to claim 1, wherein the amount of the polyimide-based binder is 30% by mass or less with respect to the total mass of the negative electrode active material layer.

4. The method for producing a negative electrode active material layer according to claim 1, wherein the electrode mixture paste comprises no polymer-based binder other than the precursor for forming a polyimide-based binder.

5. The method for producing a negative electrode active material layer according to claim 1, wherein the precursor for forming a polyimide-based binder is converted to the polyimide-based binder while heat-treating the electrode mixture paste at 80° C. to 350° C.

6. The method for producing a negative electrode active material layer according to claim 1, wherein the aromatic tetracarboxylic acid comprises an acid form of one or more compounds selected from the group consisting of 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenone tetracarboxylic dianhydride, 4,4'-oxydiphthalic dianhydride, diphenylsulfonetetracarboxylic dianhydride, p-terphenyltetracarboxylic dianhydride, and m-terphenyltetracarboxylic dianhydride; and the aromatic diamine comprises one or more compounds selected from the group consisting of p-phenylenediamine, m-phenylenediamine, 4,4'-diaminodiphenyl ether, 4,4'-diaminodiphenylmethane, 2,4-toluenediamine, 3,3'-dihydroxy-4,4'-diaminobiphenyl, bis(4-amino-3-carboxyphenyl) methane, and 2,4-diaminotoluene.

7. The method for producing a negative electrode active material layer according to claim 1, wherein the aromatic tetracarboxylic acid comprises an acid form of at least one of 4,4'-oxydiphthalic dianhydride and diphenylsulfonetetracarboxylic dianhydride, p-terphenyltetracarboxylic dianhydride; and/or the aromatic diamine comprises one or more compounds selected from the group consisting of p-phenylenediamine, m-phenylenediamine, 4,4'-diaminodiphenyl ether, 4,4'-diaminodiphenylmethane, and bis(4-amino-3-carboxyphenyl) methane.

8. The method for producing a negative electrode active material layer according to claim 1, wherein the aromatic tetracarboxylic acid comprises an acid form of 4,4'-oxydiphthalic dianhydride.

* * * * *